United States Patent
Hong

(10) Patent No.: US 11,540,160 B2
(45) Date of Patent: Dec. 27, 2022

(54) TRANSMISSION CAPABILITY UPDATE METHOD AND APPARATUS

(71) Applicant: XIAOMI COMMUNICATIONS CO., LTD., Beijing (CN)

(72) Inventor: Wei Hong, Beijing (CN)

(73) Assignee: XIAOMI COMMUNICATIONS CO., LTD., Beijing (CN)

( * ) Notice: Subject to any disclaimer, the term of this patent is extended or adjusted under 35 U.S.C. 154(b) by 81 days.

(21) Appl. No.: 16/879,684

(22) Filed: May 20, 2020

(65) Prior Publication Data
US 2020/0280870 A1    Sep. 3, 2020

Related U.S. Application Data

(63) Continuation of application No. PCT/CN2017/113618, filed on Nov. 29, 2017.

(51) Int. Cl.
*H04W 24/10* (2009.01)
*H04W 8/22* (2009.01)

(52) U.S. Cl.
CPC ............ *H04W 24/10* (2013.01); *H04W 8/22* (2013.01)

(58) Field of Classification Search
None
See application file for complete search history.

(56) References Cited

U.S. PATENT DOCUMENTS 10,485,000 B2 * 11/2019 Shaheen .............. H04W 28/08
10,536,955 B2 *  1/2020 Gholmieh .......... H04W 72/0486
11,019,655 B2 *  5/2021 Yiu .................... H04W 48/12
11,115,809 B2 *  9/2021 Liang ................. H04L 5/0053
11,160,083 B2 * 10/2021 Xu .................... H04W 8/24
2016/0157228 A1   6/2016 Yum et al.
2017/0098489 A1 *  4/2017 Serdynski ............ H05K 5/04
2017/0311170 A1  10/2017 Jang et al.
2018/0049213 A1 *  2/2018 Gholmieh ......... H04W 72/1215
2019/0327607 A1 * 10/2019 Xiao .................. H04W 76/00

FOREIGN PATENT DOCUMENTS

CN    101730058 A    6/2010
CN    103974234 A    8/2014
CN    104519583 A    4/2015
(Continued)

OTHER PUBLICATIONS

International Search Report in the international application No. PCT/CN2017/113618, dated Aug. 29, 2018.
(Continued)

*Primary Examiner* — Kevin D Mew
(74) *Attorney, Agent, or Firm* — Syncoda LLC; Feng Ma

(57) ABSTRACT

A transmission capability update method can be applied to a terminal capable of communicating with a long-term evolution (LTE) base station and a new radio (NR) base station. The method can include: determining that a transmission capability of the terminal has changed; generating capability update report information, wherein the capability update report information includes the changed transmission capability of the terminal; and sending the capability update report information to the NR base station, so that the NR base station sends the changed transmission capability of the terminal to the LTE base station.

13 Claims, 12 Drawing Sheets

(56) References Cited

FOREIGN PATENT DOCUMENTS

| CN | 104519585 | A | 4/2015 |
|---|---|---|---|
| CN | 106162613 | A | 11/2016 |
| CN | 106488567 | A | 3/2017 |
| CN | 107231623 | A | 10/2017 |
| CN | 107409320 | A | 11/2017 |
| WO | 2017185199 | A1 | 11/2017 |

OTHER PUBLICATIONS

1st Chinese Office Action (CNOA1) in CN 201780002123.0, dated Mar. 19, 2021.
Samsung, "Network control of UE capability suspension", (R2-1709483), 3GPP TSG-RAN WG2 meeting #99 Berlin, Germany, Aug. 21-25, 2017.
Nokia, Alcatel-Lucent Shanghai Bell, "Tight interworking procedures for Option 3/3a", (R3-162708), 3GPP TSG-RAN WG3 Meeting #94, Reno, USA, Nov. 14-18, 2016.
Extended European Search Report for Application No. 17933361.2, dated Nov. 9, 2020.
3GPP TSG-RAN WG2 #97bis, Apr. 3-7, 2017, Spokane, USA, Ue capability coordination for LTE-NR Dual Connectivity, R2-1702680, Source: NTT Docomo, Inc.
3GPP TSG-RAN WG2 NR Ad Hoc, 17th-19the Jan. 2017, Spokane, USA, Further discussion on UE capability Signaling, R2-1700293, Source: HTC.
3GPP TSG-RAN WG4 RAN4 #84, Berlin, Germany, Aug. 27-29, 2017, WF on UE capability signaling for LTE-NR DC Band Combination, R4-1708944, Intelcorporation Huawei Apple Hisilicon Vivo Oppo.
3GPP TSG-RAN WG2 Meeting #99, Berlin, Germany, Aug. 21-25, 2017, UE overheating problem, Source Qualcomm Incorporated, R2-1708978.
3GPP TSG-RAN2 #95bis, Oct. 10-14, 2016, Kaohsiung, Taiwan, UE capability and Radio Configuration Coordination for NR-LTE tight interworking, Source: NTT Docomo, Inc., R2-167109.
Satellite Communication System by Wang Lina, Wang Bing released Apr. 2014 by National Defense Industry Press.

* cited by examiner

TRANSMISSION CAPABILITY UPDATE METHOD AND APPARATUS

CROSS-REFERENCE TO RELATED APPLICATION

This is a continuation of International Patent Application No. PCT/CN2017/113618 filed on Nov. 29, 2017, the disclosure of which is hereby incorporated by reference in its entirety.

BACKGROUND

With the continuous development of communication technologies, smart terminals have been widely adopted. In new generation communication systems, a new application scenario can be provided, namely EUTRAN NR-Dual Connectivity (EN-DC, LTE network and NR network dual connection) scenario, in which the Long-Term Evolution (LTE) network is a 4G network, and the New Radio (NR) network is a 5G network. In this scenario, the terminal may need to maintain two communication links simultaneously, one for the LTE communication link and one for the NR communication link.

SUMMARY

The present disclosure relates generally to communication technologies, and more specifically to transmission capability update methods and devices.

According to a first aspect of embodiments of the present disclosure, there is provided a transmission capability update method. The method is applied in a terminal and the terminal is in communication with a long-term evolution (LTE) base station and a new radio (NR) base station. The method includes:

determining that a transmission capability of the terminal has changed;

generating capability update report information, wherein the capability update report information includes the changed transmission capability of the terminal; and sending the capability update report information to the NR base station, so that the NR base station sends the changed transmission capability of the terminal to the LTE base station.

According to some embodiments, the determining that a transmission capability of the terminal has changed includes:

obtaining the transmission capability of the terminal at a current time moment;

determining whether the transmission capability of the terminal at the current time moment is different from the transmission capability of the terminal at a previous time moment; and if the transmission capability of the terminal at the current time is different from the transmission capability of the terminal at a previous time moment, determining that the transmission capability of the terminal has changed.

According to some embodiments, the method further includes:

sending initial capability report information to the LTE base station and the NR base station, wherein the initial capability report information includes an initial transmission capability of the terminal.

According to some embodiments, the method further includes:

receiving capability update indication information sent by the NR base station, wherein the capability update indication information is used to indicate whether the terminal is allowed to report a changed transmission capability; and determining, according to the capability update indication information, whether the NR base station allows the terminal to report a changed transmission capability.

According to some embodiments, the transmission capability of the terminal includes a transmission capability of the terminal on different channel combinations in different frequency band combinations.

According to some embodiments, the transmission capability of the terminal on different channel combinations in different frequency band combinations includes: a capability of the terminal which indicates whether the terminal supports single uplink transmission or dual uplink transmission on one channel combination in one frequency band combination.

According to some embodiments, the sending the capability update report information to the NR base station includes:

adding the capability update report information to radio resource control (RRC) signaling; and sending the RRC signaling to the NR base station, so that the NR base station obtains the changed transmission capability of the terminal from the RRC signaling.

According to some embodiments, the sending the capability update report information to the NR base station includes:

adding the capability update report information to terminal assistance information signaling; and sending the terminal assistance information signaling to the NR base station, so that the NR base station obtains the changed transmission capability of the terminal from the terminal assistance information signaling.

According to some embodiments, the method further includes:

receiving transmission configuration information sent by the LTE base station, wherein the transmission configuration information is information obtained after the LTE base station performs transmission configuration for the terminal according to the changed transmission capability of the terminal; and performing data transmission according to the transmission configuration information.

According to a second aspect of embodiments of the present disclosure, there is provided a transmission capability update method. The method is applied in a new radio (NR) base station which is in communication with a terminal and a long-term evolution (LTE) base station. The method includes:

receiving capability update report information sent by the terminal, wherein the capability update report information includes a changed transmission capability of the terminal;

when it is determined that a transmission capability of the terminal has changed according to the capability update report information, updating locally stored information according to the changed transmission capability of the terminal; and sending the changed transmission capability of the terminal to the LTE base station, so that the LTE base station updates locally stored information according to the changed transmission capability of the terminal.

According to some embodiments, the method further includes:

receiving initial capability report information sent by the terminal, wherein the initial capability report information includes an initial transmission capability of the terminal; and storing the initial transmission capability of the terminal.

According to some embodiments, the determining that a transmission capability of the terminal has changed according to the capability update report information includes:

obtaining the changed transmission capability of the terminal included in the capability update report information;

determining whether the changed transmission capability of the terminal is different from the initial transmission capability of the terminal; and if the changed transmission capability of the terminal is different from the initial transmission capability of the terminal, determining that the transmission capability of the terminal has changed.

According to some embodiments, the method further includes:

determining whether the terminal is allowed to report the changed transmission capability and obtaining a determination result;

generating capability update indication information according to the determination result, wherein the capability update indication information is used to indicate whether the terminal is allowed to report the changed transmission capability; and sending the capability update indication information to the terminal, so that the terminal determines whether the NR base station allows the terminal to report the changed transmission capability according to the capability update indication information.

According to some embodiments, the sending the changed transmission capability of the terminal to the LTE base station includes:

sending the changed transmission capability of the terminal to the LTE base station through an X2 interface.

According to a third aspect of embodiments of the present disclosure, there is provided a transmission capability update method. The method is applied in a long-term evolution (LTE) base station which is in communication with a terminal and a new radio (NR) base station. The method includes:

receiving a changed transmission capability of the terminal sent by the NR base station; and updating locally stored information according to the changed transmission capability of the terminal.

According to some embodiments, the method further includes:

performing transmission configuration for the terminal according to the changed transmission capability of the terminal to obtain transmission configuration information; and sending the transmission configuration information to the terminal, so that the terminal performs data transmission according to the transmission configuration information.

According to a fourth aspect of embodiments of the present disclosure, there is provided a transmission capability update device. The device is applied in a terminal which is in communication with a long-term evolution (LTE) base station and a new radio (NR) base station. The device includes:

a capability change determination module configured to determine that a transmission capability of the terminal has changed;

a report information generation module configured to generate capability update report information, wherein the capability update report information includes the changed transmission capability of the terminal; and a first reporting module configured to send the capability update report information to the NR base station, so that the NR base station sends the changed transmission capability of the terminal to the LTE base station.

According to some embodiments, the capability change determination module includes:

a first obtaining submodule configured to obtain the transmission capability of the terminal at a current time moment;

a first judgment submodule configured to determine whether the transmission capability of the terminal at the current time moment is different from the transmission capability of the terminal at a previous time moment; and a first determination submodule configured to determine that the transmission capability of the terminal has changed if the first judgment submodule determines that transmission capability of the terminal at the current time is different from the transmission capability of the terminal at a previous time moment, According to some embodiments, the device further includes:

a second reporting module configured to send initial capability report information to the LTE base station and the NR base station, wherein the initial capability report information includes an initial transmission capability of the terminal.

According to some embodiments, the device further includes:

an indication information receiving module configured to receive capability update indication information sent by the NR base station, wherein the capability update indication information is used to indicate whether the terminal is allowed to report a changed transmission capability; and an indication information determination module configured to determine, according to the capability update indication information, whether the NR base station allows the terminal to report a changed transmission capability.

According to some embodiments, the transmission capability of the terminal includes a transmission capability of the terminal on different channel combinations in different frequency band combinations.

According to some embodiments, the transmission capability of the terminal on different channel combinations in different frequency band combinations includes: a capability of the terminal which indicates whether the terminal supports single uplink transmission or dual uplink transmission on one channel combination in one frequency band combination.

According to some embodiments, the first reporting module includes:

a first addition submodule configured to add the capability update report information to radio resource control (RRC) signaling; and a first sending submodule configured to send the RRC signaling to the NR base station, so that the NR base station obtains the changed transmission capability of the terminal from the RRC signaling.

According to some embodiments, the first reporting module includes:

a second addition submodule configured to add the capability update report information to terminal assistance information signaling; and a second sending submodule configured to send the terminal assistance information signaling to the NR base station, so that the NR base station obtains the changed transmission capability of the terminal from the terminal assistance information signaling.

According to some embodiments, the device further includes:

a configuration information receiving module configured to receive transmission configuration information sent by the LTE base station, wherein the transmission configuration information is information obtained after the LTE base station performs transmission configuration for the terminal according to the changed transmission capability of the terminal; and a data transmission module configured to perform data transmission according to the transmission configuration information.

According to a fifth aspect of embodiments of the present disclosure, there is provided a transmission capability update device. The device is applied in a new radio (NR) base station which is in communication with a terminal and a long-term evolution (LTE) base station. The device includes:

a first receiving module configured to receive capability update report information sent by the terminal, wherein the capability update report information includes a changed transmission capability of the terminal;

a capability update module configured to, when it is determined that a transmission capability of the terminal has changed according to the capability update report information, update locally stored information according to the changed transmission capability of the terminal; and a capability sending module configured to send the changed transmission capability of the terminal to the LTE base station, so that the LTE base station updates locally stored information according to the changed transmission capability of the terminal.

According to some embodiments, the device further includes:

a second receiving module configured to receive initial capability report information sent by the terminal, wherein the initial capability report information includes an initial transmission capability of the terminal; and a capability storage module configured to store the initial transmission capability of the terminal.

According to some embodiments, the capability update module includes:

a second obtaining submodule configured to obtain the changed transmission capability of the terminal included in the capability update report information;

a second judgment submodule configured to determine whether the changed transmission capability of the terminal is different from the initial transmission capability of the terminal;

a second determination submodule configured to determine that the transmission capability of the terminal has changed if the second judgment submodule determines that changed transmission capability of the terminal is different from the initial transmission capability of the terminal; and a capability update submodule configured to update locally stored information according to the changed transmission capability of the terminal.

According to some embodiments, the device further includes:

a report determination module configured to determine whether the terminal is allowed to report the changed transmission capability and obtain a determination result;

an indication information generation module configured to generate capability update indication information according to the determination result, wherein the capability update indication information is used to indicate whether the terminal is allowed to report the changed transmission capability; and an indication information sending module configured to send the capability update indication information to the terminal, so that the terminal determines whether the NR base station allows the terminal to report the changed transmission capability according to the capability update indication information.

According to some embodiments, the capability sending module includes:

a capability sending submodule configured to send the changed transmission capability of the terminal to the LTE base station through an X2 interface.

According to a sixth aspect of embodiments of the present disclosure, there is provided a transmission capability update device. The device is applied in a long-term evolution (LTE) base station which is in communication with a terminal and a new radio (NR) base station. The device includes:

a capability receiving module configured to receive a changed transmission capability of the terminal sent by the NR base station; and an information storage update module configured to update locally stored information according to the changed transmission capability of the terminal.

According to some embodiments, the device further includes:

a transmission configuration module configured to perform transmission configuration for the terminal according to the changed transmission capability of the terminal to obtain transmission configuration information; and a configuration information sending module configured to send the transmission configuration information to the terminal, so that the terminal performs data transmission according to the transmission configuration information.

According to a seventh aspect of embodiments of the present disclosure, there is provided a non-transitory computer-readable storage medium having a computer program stored thereon, wherein the computer program is configured to implement the transmission capability update method according to the first aspect.

According to an eighth aspect of embodiments of the present disclosure, there is provided a non-transitory computer-readable storage medium having a computer program stored thereon, wherein the computer program is configured to implement the transmission capability update method according to the second aspect.

According to a ninth aspect of embodiments of the present disclosure, there is provided a non-transitory computer-readable storage medium having a computer program stored thereon, wherein the computer program is configured to implement the transmission capability update method according to the third aspect.

According to a tenth aspect of embodiments of the present disclosure, there is provided a transmission capability update device. The device is applied in a terminal which is in communication with a long-term evolution (LTE) base station and a new radio (NR) base station. The device includes:

a processor; and memory for storing instructions executable by the processor;

wherein the processor is configured to:

determine that a transmission capability of the terminal has changed;

generate capability update report information, wherein the capability update report information includes the changed transmission capability of the terminal; and send the capability update report information to the NR base station, so that the NR base station sends the changed transmission capability of the terminal to the LTE base station.

According to an eleventh aspect of embodiments of the present disclosure, there is provided a transmission capability update device. The device is applied in a new radio (NR) base station which is in communication with a terminal and a long-term evolution (LTE) base station. The device includes:

a processor; and memory for storing instructions executable by the processor;

wherein the processor is configured to:

receive capability update report information sent by the terminal, wherein the capability update report information includes a changed transmission capability of the terminal;

when it is determined that a transmission capability of the terminal has changed according to the capability update report information, update locally stored information according to the changed transmission capability of the terminal; and send the changed transmission capability of the terminal to the LTE base station, so that the LTE base station updates locally stored information according to the changed transmission capability of the terminal.

According to a twelfth aspect of embodiments of the present disclosure, there is provided a transmission capability update device. The device is applied in a long-term evolution (LTE) base station which is in communication with a terminal and a new radio (NR) base station. The device includes:

a processor; and memory for storing instructions executable by the processor;

wherein the processor is configured to:

receive a changed transmission capability of the terminal sent by the NR base station; and update locally stored information according to the changed transmission capability of the terminal.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this disclosure, illustrate embodiments consistent with the disclosure and, together with the description, serve to explain the principles of some embodiments of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terminologies used in this disclosure are for the purpose of describing exemplary embodiments and are not intended to limit the disclosure. As used in this disclosure and the appended claims, the singular forms "a," "the" and "said" are intended to include the plural forms as well, unless the context clearly indicates otherwise. It should also be understood that the term "and/or" as used herein refers to any or all possible combinations of one or more of associated listed items.

It should be understood that, although the terms like first, second, third, etc. may be used in this disclosure to describe various information, such information should not be limited to these terms. These terms are only used to distinguish the same type of information from each other. For example, without departing from the scope of the present disclosure, first information may also be referred to as second information, and similarly, the second information may also be referred to as the first information. Depending on the context, the word "if" as used herein can be interpreted as "when" or "in response to . . . ."

Typically, when the transmission capability of a terminal is updated, the terminal generally updates its transmission capability information in a detachment or reattachment manner. However, detachment or reattachment will cause service interruption, thereby seriously affecting service performance and user experience.

Figure 1:
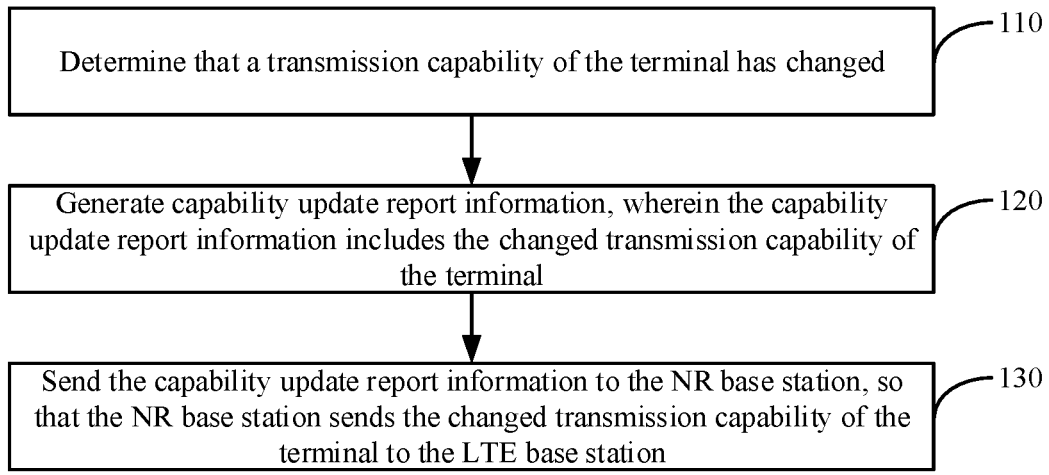
FIG. 1 is a flowchart of a transmission capability update method according to some embodiments.
Figure 2:
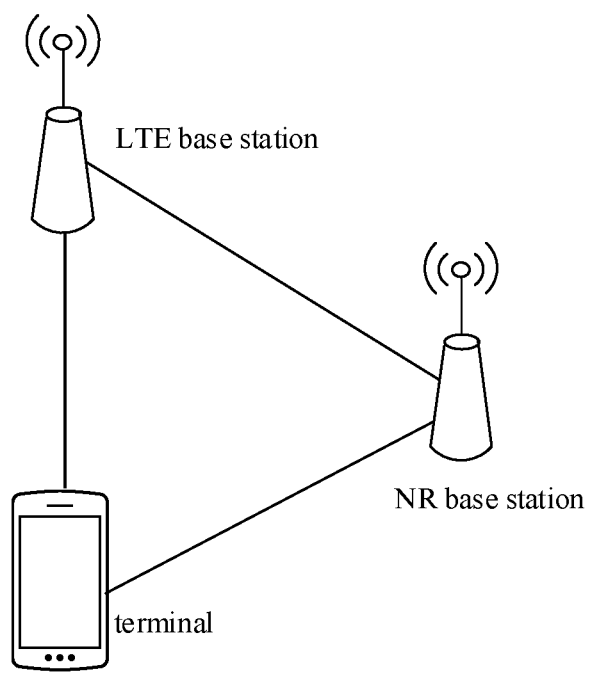
FIG. 2 is a scenario diagram illustrating a transmission capability update method according to some embodiments.

FIG. 1 is a flowchart of a transmission capability update method according to some embodiments, and FIG. 2 is a scenario diagram illustrating a transmission capability update method according to some embodiments. The transmission capability update method can be applied in a terminal which can be in communication with an LTE base station and a NR base station. As shown in FIG. 1, the transmission capability update method includes the following steps 110-130.

In step 110, that a transmission capability of the terminal has changed is determined.

In some embodiments of the present disclosure, when the terminal moves to a cell center or switches to a small cell, the uplink transmission power of the terminal will decrease, thereby reducing originally serious intermodulation interference and causing a change in the transmission capability of the terminal.

In some embodiments, the transmission capability of the terminal includes a transmission capability of the terminal on different channel combinations in different frequency band combinations. One frequency band combination may include more than two frequency bands, and one channel combination may also include more than two channels.

In some embodiments, the transmission capability of the terminal on different channel combinations in different frequency band combinations includes: a capability of the terminal which indicates whether the terminal supports single uplink transmission or dual uplink transmission on one channel combination in one frequency band combination. If the terminal supports dual uplink transmission, it can be understood that no intermodulation interference will occur when data is transmitted simultaneously on the frequency band combination. If the terminal supports single uplink transmission, it can be understood that data cannot be transmitted simultaneously on the frequency band combination. For example, the terminal supports dual uplink transmission on the combination of the first channel in the 1000 MHz frequency band and the second channel in the 1100 MHz frequency band, indicating that the terminal will not generate intermodulation interference when the resources on the channel combination in the frequency band combination are configured. As another example, the terminal supports single uplink transmission on the combination of the first channel in the 800 MHz frequency band and the second channel in the 900 MHz frequency band, indicating that when resources on the channel combination in the frequency band combination are configured for the terminal, intermodulation interference will occur.

In step 120, capability update report information is generated. The capability update report information includes the changed transmission capability of the terminal.

In some embodiments of the present disclosure, the terminal may not directly and dynamically report the changed transmission capability to the LTE base station, but may directly report the changed transmission capability to the NR base station which forwards the changed transmission capability of the terminal to the LTE base station.

In step 130, the capability update report information is sent to the NR base station, so that the NR base station sends the changed transmission capability of the terminal to the LTE base station.

In an exemplary scenario, as shown in FIG. 2, a terminal, an LTE base station, and an NR base station can be in wireless communication. When the terminal determines that its own transmission capability has changed, it can generate capability update report information, which includes the changed transmission capability of the terminal, and send the capability update report information to the NR base station which sends the changed transmission capability of the terminal to the LTE base station.

As can be seen from the foregoing embodiments, after determining that the transmission capability has changed, the terminal may actively generate capability update report information which includes the changed transmission capability of the terminal and send the capability update report information to the NR base station, so that the NR base station can send the changed transmission capability of the terminal to the LTE base station. Accordingly, both the NR base station and the LTE base station can learn the changed transmission capability of the terminal and update their respective information storage based on the changed transmission capability of the terminal without affecting service transmission of the terminal, thereby improving the efficiency of transmission capability update.

Figure 3:
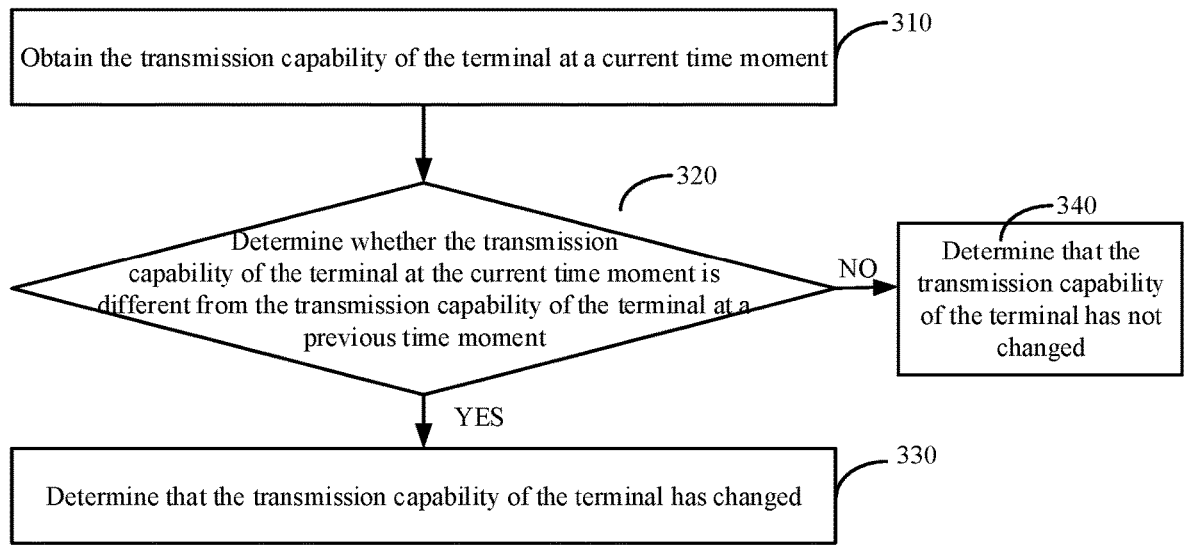
FIG. 3 is a flowchart of a transmission capability update method according to some embodiments.

FIG. 3 is a flowchart of a transmission capability update method according to some embodiments. The transmission capability update method may be applied in a terminal. On the basis of the method illustrated in FIG. 1, step 110 may include the following steps 310-340, as shown in FIG. 3.

In step 310, the transmission capability of the terminal at a current time moment is obtained.

In step 320, whether the transmission capability of the terminal at the current time moment is different from the transmission capability of the terminal at a previous time moment is determined; if the transmission capability of the terminal at the current time is different from the transmission capability of the terminal at a previous time moment, the method proceeds to step 330; if the transmission capability of the terminal at the current time is not different from the transmission capability of the terminal at a previous time moment, the method proceeds to step 340.

In some embodiments of the present disclosure, when determining for the first time, the initial transmission capability of the terminal may be determined as the transmission capability of the terminal at the previous time moment, that is, whether the transmission capability of the terminal at the current time moment is different from the initial transmission capability of the terminal. If they are different, it means that the transmission capability of the terminal has changed; if they are the same, it means that the transmission capability of the terminal has not changed.

In step 330, it is determined that the transmission capability of the terminal has changed.

In step 340, it is determined that the transmission capability of the terminal has not changed.

As can be seen from the foregoing embodiments, whether the transmission capability of the terminal has changed is determined by comparing the transmission capability of the terminal at different time moments, and thus the accuracy of the transmission capability update can be improved.

Figure 4:
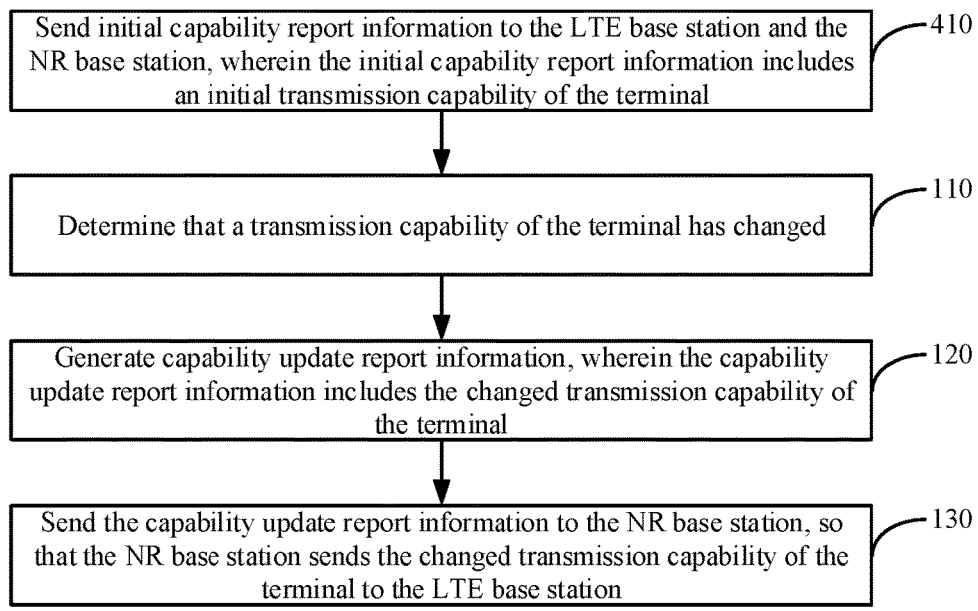
FIG. 4 is a flowchart of a transmission capability update method according to some embodiments.

FIG. 4 is a flowchart of transmission capability update method according to some embodiments. The transmission capability update method can be applied to a terminal. On the basis of the method shown in FIG. 1, the transmission capability update method further includes the following step 410, as shown in FIG. 4.

In step 410, initial capability report information is sent to the LTE base station and the NR base station. The initial capability report information includes an initial transmission capability of the terminal.

In some embodiments of the present disclosure, the initial transmission capability of the terminal may include: the transmission capability of the terminal initially on different channel combinations in different frequency band combinations.

After the terminal sends initial capability report information to the LTE base station and the NR base station, when it is determined that the transmission capability has changed, the terminal can report the changed transmission capability to the NR base station through the capability update report information, and the NR base station then forwards the changed transmission capability of the terminal to the LTE base station.

As can be seen from the above embodiments, initial capability report information is sent to the LTE base station and the NR base station, and the initial capability report information includes the initial transmission capability of the terminal, and accordingly both the NR base station and the LTE base station can know the initial transmission capability of the terminal. Thus, the practicability of transmission capability updates is improved.

Figure 5:
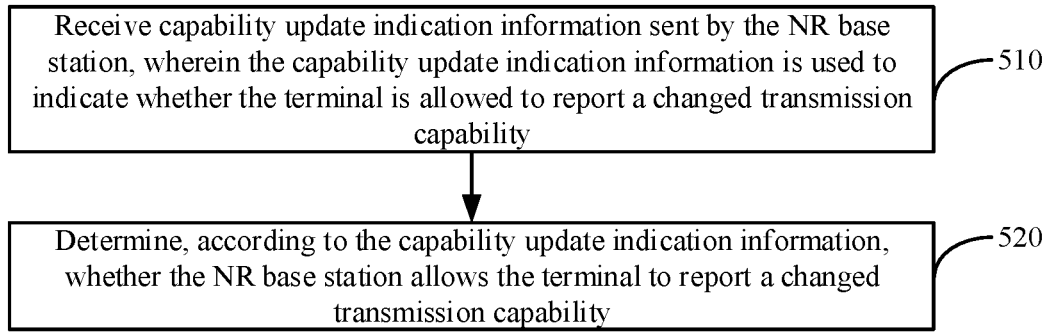
FIG. 5 is a flowchart of a transmission capability update method according to some embodiments.

FIG. 5 is a flowchart of a transmission capability update method according to some embodiments. The transmission capability update method can be applied in a terminal. On the basis of the method shown in FIG. 1 or FIG. 4, the transmission capability update method further includes the following steps 510-520 as shown in FIG. 5.

In step 510, capability update indication information sent by the NR base station is received. The capability update indication information is used to indicate whether the terminal is allowed to report a changed transmission capability.

In some embodiments of the present disclosure, the capability update indication information may indicate that the NR base station allows the terminal to report the changed transmission capability, or may indicate that the NR base station does not allow the terminal to report the changed transmission capability.

In step 520, according to the capability update indication information, whether the NR base station allows the terminal to report a changed transmission capability is determined.

In some embodiments of the present disclosure, the terminal receives the capability update instruction information, and can determine whether the NR base station allows the terminal to report the changed transmission capability or does not allow the terminal to report the changed transmission capability according to the contents in the capability update indication information.

After the terminal determines that the NR base station allows the terminal to report the changed transmission capability according to the capability update indication information and the terminal determines that its transmission capability has changed, the terminal reports the changed transmission capability of the terminal to the NR base station through the capability update report information, and the NR base station forwards the changed transmission capability of the terminal to the LTE base station.

After the terminal determines that the NR base station does not allow the terminal to report the changed transmission capability according to the capability update indication information and the terminal determines that its transmission capability has changed, the terminal will not report the changed transmission capability to the NR base station.

As can be seen from the foregoing embodiments, the capability update indication information sent by the NR base station is received, the capability update indication information is used to indicate whether the terminal is allowed to report the changed transmission capability. Whether the NR base station allows the terminal to report the changed transmission capability can be determined according to the capability update indication information. In this way, the terminal can report its changed transmission capability with the permission of the NR base station, without the need to update its own transmission capability information in a detachment or reattachment manner, thereby satisfying the terminal's individual needs for dynamically reporting changed transmission capability while not affecting the service performance and user experience of the terminal. Accordingly, the reliability in transmission capability update can be improved.

Figure 6:
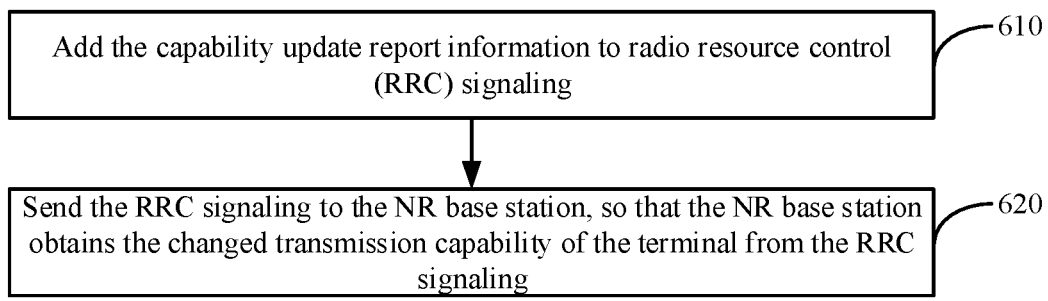
FIG. 6 is a flowchart of a transmission capability update method according to some embodiments.

FIG. 6 is a flowchart of a transmission capability update method according to some embodiments. The transmission capability update method may be applied in a terminal. On the basis of the method shown in in FIG. 1, when step 130 is performed, the terminal's changed transmission capability can be reported to the NR base station through Radio Resource Control (RRC) signaling. As shown in FIG. 6, step 130 can include the following steps 610-620.

In step 610, the capability update report information is added to RRC signaling.

In step 620, the RRC signaling is sent to the NR base station, so that the NR base station obtains the changed transmission capability of the terminal from the RRC signaling.

As can be seen from the above embodiments, adding the capability update report information to the RRC signaling and sending the RRC signaling to the NR base station are beneficial for the NR base station to obtain the changed transmission capability of the terminal from the RRC signaling. This improves the reliability in transmission capability update.

Figure 7:
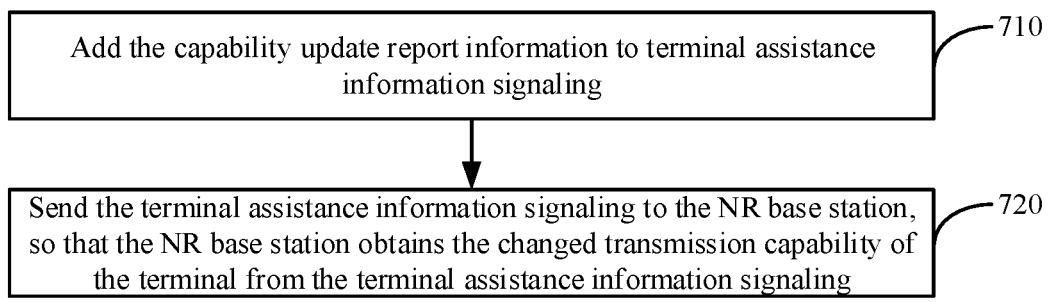
FIG. 7 is a flowchart of a transmission capability update method according to some embodiments.

FIG. 7 is a flowchart of transmission capability update method according to some embodiments. The transmission capability update method may be applied in a terminal. On the basis of the method shown in FIG. 1, when step 130 is performed, the terminal's changed transmission capability can be reported to the NR base station through terminal assistance information signaling. As shown in FIG. 7, step 130 can include the following steps 710-720.

In step 710, the capability update report information is added to the terminal assistance information signaling.

In step 720, the terminal assistance information signaling is sent to the NR base station, so that the NR base station obtains the changed transmission capability of the terminal from the terminal assistance information signaling.

As can be seen from the foregoing embodiments, adding the capability update report information to the terminal assistance information signaling, and sending the terminal assistance information signaling to the NR base station are beneficial for the NR base station to obtain the changed transmission capability of the terminal from the terminal assistance information signaling, thereby enriching the transmission method of the capability update report information, and also improving the efficiency of transmission capability update.

Figure 8:
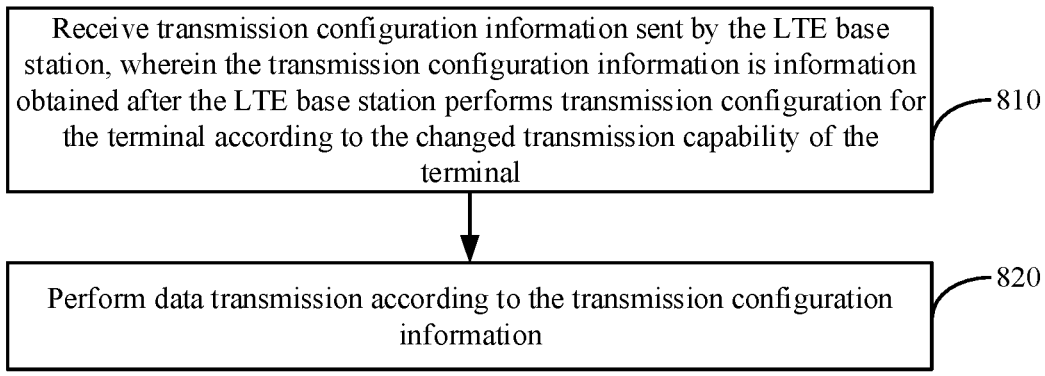
FIG. 8 is a flowchart of a transmission capability update method according to some embodiments.

FIG. 8 is a flowchart of a transmission capability update method according to some embodiments. The transmission capability update method can be applied in a terminal. On the basis of the method shown in FIG. 1, the transmission capability update method further includes the following steps 810-820.

In step 810, transmission configuration information sent by the LTE base station is received. The transmission configuration information is information obtained after the LTE base station performs transmission configuration for the terminal according to the changed transmission capability of the terminal.

In step 820, data transmission is performed according to the transmission configuration information.

As can be seen from the foregoing embodiments, transmission configuration information sent by an LTE base station is received, and the transmission configuration information is information obtained after the LTE base station performs transmission configuration for the terminal according to the changed transmission capability of the terminal. Data transmission is performed according to the transmission configuration information. In this way, the terminal can perform data transmission according to the latest transmission configuration sent by the LTE base station, thereby improving the quality of data transmission and improving the utilization rate of transmission resources.

Figure 9:
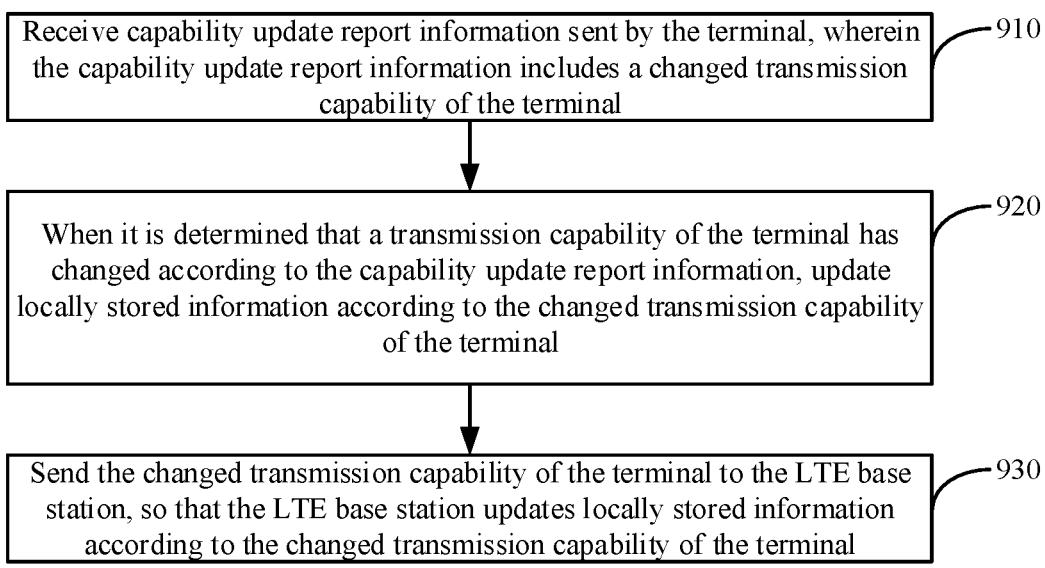
FIG. 9 is a flowchart of a transmission capability update method according to some embodiments.

FIG. 9 is a flowchart of a transmission configuration method according to some embodiments. The transmission configuration method can be applied in an NR base station, which is in communication with a terminal and an LTE base station. As shown in FIG. 9, the transmission configuration method includes the following steps 910-930.

In step 910, capability update report information sent by the terminal is received. The capability update report information includes a changed transmission capability of the terminal.

In step 920, when it is determined that a transmission capability of the terminal has changed according to the capability update report information, locally stored information is updated according to the changed transmission capability of the terminal.

In step 930, the changed transmission capability of the terminal is sent to the LTE base station, so that the LTE base station updates locally stored information according to the changed transmission capability of the terminal.

In some embodiments, the NR base station may send the changed transmission capability of the terminal to the LTE base station through the X2 interface.

As can be seen from the foregoing embodiments, the NR base station can receive the capability update report information sent by the terminal. The capability update report information includes the changed transmission capability of the terminal. When it is determined that the transmission capability of the terminal has changed according to the capability update report information, locally stored information is updated according to the changed transmission capability of the terminal, and the changed transmission capability of the terminal is sent to the LTE base station, so that the LTE base station updates the locally stored information according to the changed transmission capability of the terminal. Accordingly, both the NR base station and LTE base stations can know the terminal's changed transmission capability, and update their respective information storage based on the terminal's changed transmission capability, without affecting service transmission of the terminal, thereby improving the efficiency of transmission capability update.

Figure 10:
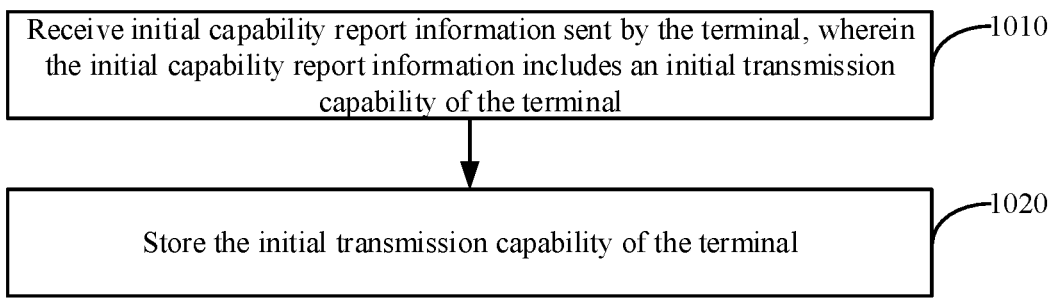
FIG. 10 is a flowchart of a transmission capability update method according to some embodiments.

FIG. 10 is a flowchart of a transmission capability update method according to some embodiments. The transmission capability update method can be applied in an NR base station. On the basis of the method shown in FIG. 9, the transmission capability update method further includes the following steps 1010-1020 as shown in FIG. 10.

In step 1010, the initial capability report information sent by the terminal is received. The initial capability report information includes the initial transmission capability of the terminal.

In step 1020, the initial transmission capability of the terminal is stored.

As can be seen from the foregoing embodiments, the initial capability report information sent by the terminal is received, and the initial capability report information includes the initial transmission capability of the terminal and stores the initial transmission capability of the terminal, and thus the practicability of transmission capability update is improved.

Figure 11:
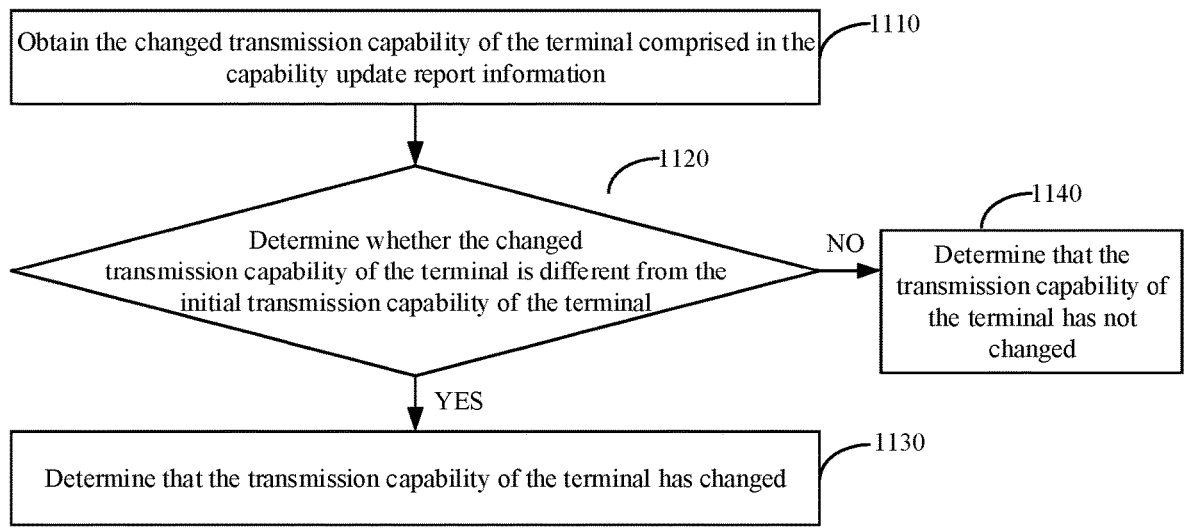
FIG. 11 is a flowchart of a transmission capability update method according to some embodiments.

FIG. 11 is a flowchart of a transmission capability update method according to some embodiments. The transmission capability update method can be used in an NR base station. On the basis of the method shown in FIG. 10, the transmission capability update method further includes the following steps 1110-1140 as shown in FIG. 11.

In step 1110, the changed transmission capability of the terminal included in the capability update report information is obtained.

In step 1120, whether the changed transmission capability of the terminal is different from the initial transmission capability of the terminal is determined. If the changed transmission capability of the terminal is different from the initial transmission capability of the terminal, the method proceeds to step 1130; if the changed transmission capability of the terminal is not different from the initial transmission capability of the terminal, the method proceeds to step 1140.

In step 1130, it is determined that the transmission capability of the terminal has changed.

In step 1140, it is determined that the transmission capability of the terminal has not changed.

As can be seen from the foregoing embodiments, whether the transmission capability of the terminal has changed is determined by comparing the changed transmission capability of the terminal included in the capability update report information with the initial transmission capability of the terminal, and accordingly the accuracy of the transmission capability update is improved.

Figure 12:
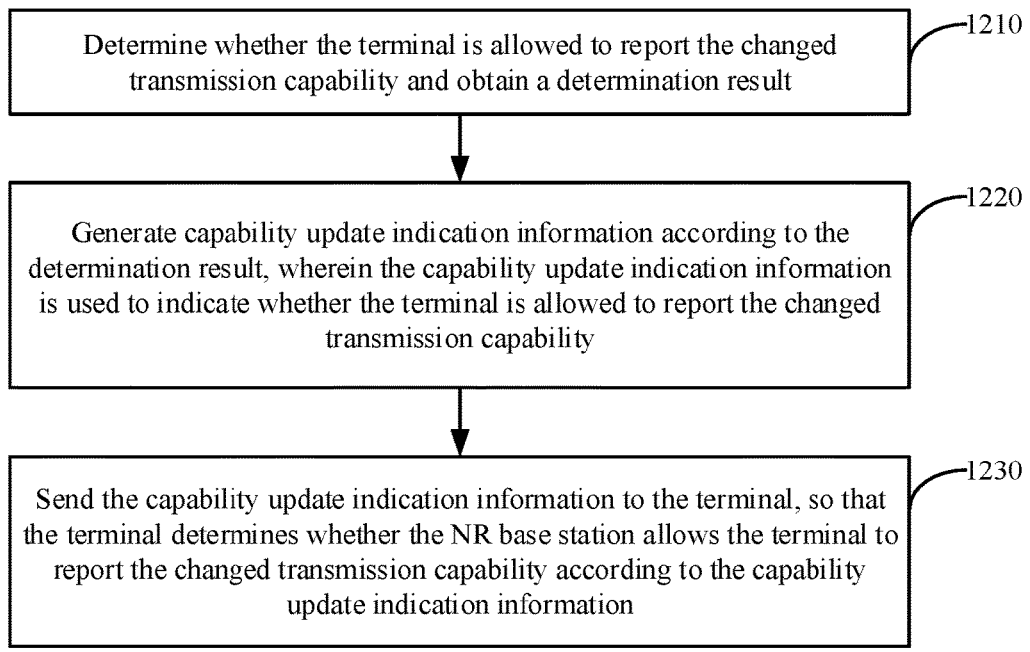
FIG. 12 is a flowchart of a transmission capability update method according to some embodiments.

FIG. 12 is a flowchart of transmission capability update method according to some embodiments. The transmission capability update method may be used in an NR base station. On the basis of the method shown in FIG. 9 or FIG. 11, the transmission capability update method further includes the following steps 1210-1230 as shown in FIG. 12.

In step 1210, whether the terminal is allowed to report the changed transmission capability is determined, and a determination result is obtained.

In step 1220, the capability update indication information is generated according to the determination result, and the capability update indication information is used to indicate whether the terminal is allowed to report the changed transmission capability.

In step 1230, the capability update indication information is sent to the terminal, so that the terminal determines whether the NR base station allows the terminal to report the changed transmission capability according to the capability update indication information.

As can be seen from the foregoing embodiments, a determination result is obtained by determining whether the terminal is allowed to report the changed transmission capability, and the capability update indication information is generated according to the determination result. The capability update indication information is used to indicate whether the terminal is allowed to report the changed transmission capability. The capability update indication information is sent to the terminal, so that the terminal determines whether the NR base station allows the terminal to report the changed transmission capability based on the capability update indication information. In this way, the terminal can report its changed transmission capability under the permission of the base station, without the need to update its own transmission capability information in a detachment or reattachment manner, thereby meeting the individual needs of the terminal to dynamically report the changed transmission capability, without affecting the terminal's service performance and user experience, and improving reliability in transmission capability update.

Figure 13:
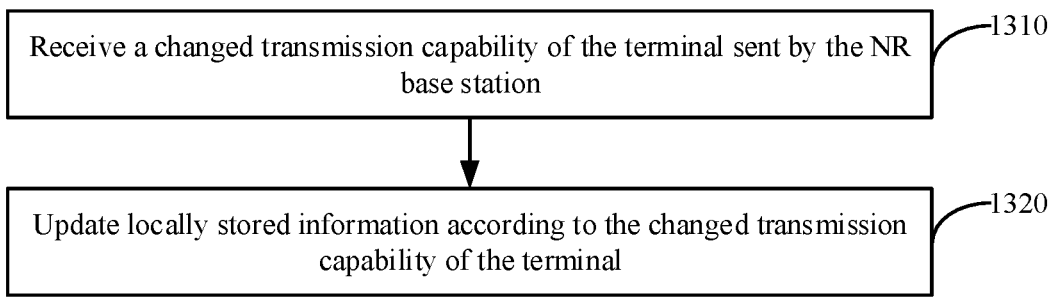
FIG. 13 is a flowchart of a transmission capability update method according to some embodiments.

FIG. 13 is a flowchart of a transmission configuration method according to some embodiments. The transmission configuration method can be applied in an LTE base station, which is in communication with a terminal and an NR base station. As shown in FIG. 13, the transmission configuration method includes the following steps 1310-1320.

In step 1310, a changed transmission capability of the terminal sent by the NR base station is received.

In the embodiments of the present disclosure, the terminal cannot directly report the changed transmission capability to the LTE base station, but can directly report the changed transmission capability to the NR base station, and the NR base station forwards the changed transmission capability of the terminal To LTE base station.

In step 1320, the locally stored information is updated according to the changed transmission capability of the terminal.

As can be seen from the foregoing embodiments, by receiving the changed transmission capability of the terminal sent by the NR base station, and updating the local information storage according to the changed transmission capability of the terminal, the efficiency in updating of the transmission capability is improved without affecting the service transmission of the terminal.

Figure 14:
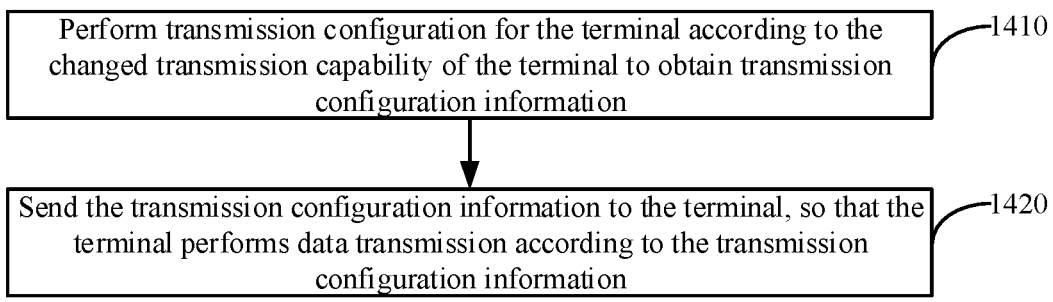
FIG. 14 is a flowchart of a transmission capability update method according to some embodiments.

FIG. 14 is a flowchart of transmission capability update method according to some embodiments. The transmission capability update method can be applied in an LTE base station. On the basis of the method shown in FIG. 13, the transmission capability update method further includes the following steps 1410-1420 as shown in FIG. 14.

In step 1410, transmission configuration is performed for the terminal according to the changed transmission capability of the terminal to obtain transmission configuration information.

In the embodiment of the present disclosure, because the transmission capability of the terminal has changed, the LTE base station may perform transmission configuration for data transmission again for the terminal according to the changed transmission capability of the terminal, and inform the terminal of the obtained transmission configuration information, so as to enable the terminal to perform data transmission according to the transmission configuration information.

In step 1420, the transmission configuration information is sent to the terminal, so that the terminal performs data transmission according to the transmission configuration information.

As can be seen from the foregoing embodiments, by performing transmission configuration for the terminal according to the changed transmission capability of the terminal, obtaining transmission configuration information, and transmitting the transmission configuration information to the terminal, the terminal can perform data transmission according to the latest transmission configuration sent by the LTE base station. This improves the quality of data transmission and also improves the utilization of transmission resources.

Corresponding to the foregoing embodiments of the transmission capability update method, the present disclosure also provides embodiments of a transmission capability update device.

Figure 15:
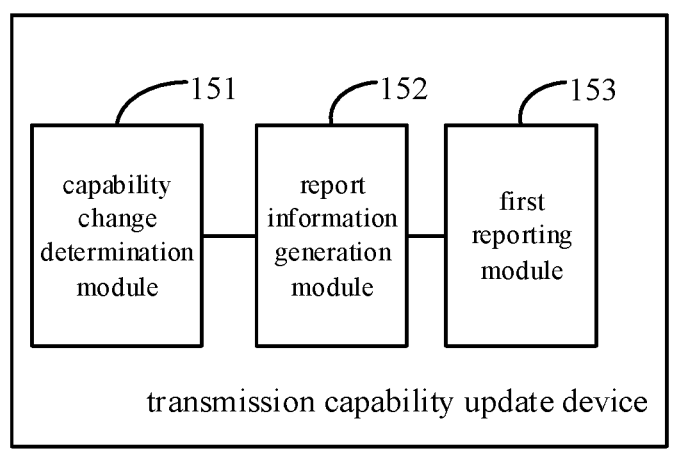
FIG. 15 is a block diagram of a transmission capability update device according to some embodiments.

FIG. 15 is a block diagram of a transmission capability update device according to some embodiments. The device can be used in a terminal, and the terminal can be in communication with an LTE base station and an NR base station. The terminal is configured to perform the transmission capability update method shown in FIG. 1. As shown in FIG. 15, the transmission capability update device may include a capability change determination module 151, a report information generation module 152 and a first reporting module 153.

The capability change determination module 151 is configured to determine that a transmission capability of the terminal has changed.

The report information generation module 152 is configured to generate capability update report information. The capability update report information includes the changed transmission capability of the terminal.

The first reporting module 153 is configured to send the capability update report information to the NR base station, so that the NR base station sends the changed transmission capability of the terminal to the LTE base station.

As can be seen from the foregoing embodiments, after determining that the transmission capability has changed, the terminal may actively generate capability update report information which includes the changed transmission capability of the terminal and send the capability update report information to the NR base station, so that the NR base station can send the changed transmission capability of the terminal to the LTE base station. Accordingly, both the NR base station and the LTE base station can learn the changed transmission capability of the terminal and update their respective information storage based on the changed transmission capability of the terminal without affecting service transmission of the terminal, thereby improving the efficiency of transmission capability update.

Figure 16:
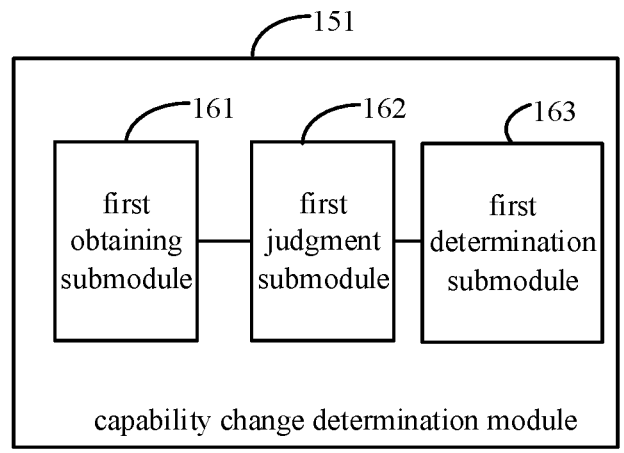
FIG. 16 is a block diagram of a transmission capability update device according to some embodiments.

According to some embodiments, on the basis of the device shown in FIG. 15, the capability change determination module 151 may include a first obtaining submodule 161, a first judgment submodule 162 and a first determination submodule 163 as shown in FIG. 16.

The first obtaining submodule 161 is configured to obtain the transmission capability of the terminal at a current time moment.

The first judgment submodule 162 is configured to determine whether the transmission capability of the terminal at the current time moment is different from the transmission capability of the terminal at a previous time moment.

The first determination submodule 163 is configured to determine that the transmission capability of the terminal has changed if the capability determination submodule determines that transmission capability of the terminal at the current time is different from the transmission capability of the terminal at a previous time moment.

As can be seen from the foregoing embodiments, whether the transmission capability of the terminal has changed is determined by comparing the transmission capability of the terminal at different time moments, and thus the accuracy of the transmission capability update can be improved.

Figure 17:
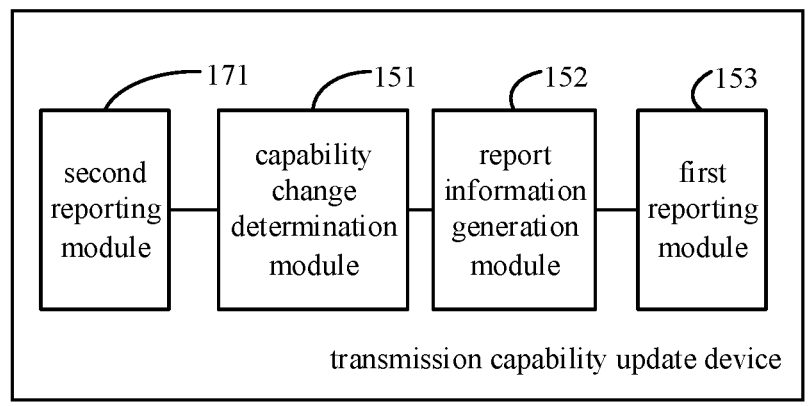
FIG. 17 is a block diagram of a transmission capability update device according to some embodiments.

According to some embodiments, on the basis of the device shown in FIG. 15, the device may further include a second reporting module 171 as shown in FIG. 17.

The second reporting module 171 is configured to send initial capability report information to the LTE base station and the NR base station. The initial capability report information includes an initial transmission capability of the terminal.

As can be seen from the above embodiments, initial capability report information is sent to the LTE base station and the NR base station, and the initial capability reporting information includes the initial transmission capability of the terminal, so that both the NR base station and the LTE base station can learn the initial transmission capability of the terminal. Thus, the practicality of transmission capability update is improved.

Figure 18:
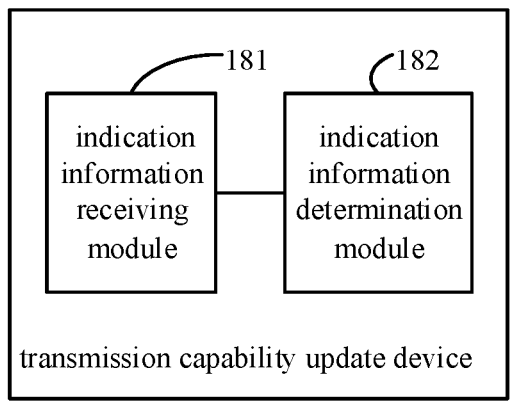
FIG. 18 is a block diagram of a transmission capability update device according to some embodiments.

According to some embodiments, on the basis of the device shown in FIG. 15 or FIG. 18, the device may further include an indication information receiving module 181 and an indication information determination module 182.

The indication information receiving module 181 is configured to receive capability update indication information sent by the NR base station. The capability update indication information is used to indicate whether the terminal is allowed to report a changed transmission capability.

The indication information determination module 182 is configured to determine, according to the capability update indication information, whether the NR base station allows the terminal to report a changed transmission capability.

As can be seen from the foregoing embodiments, the capability update indication information sent by the NR base station is received, the capability update indication information is used to indicate whether the terminal is allowed to report the changed transmission capability. Whether the NR base station allows the terminal to report the changed transmission capability can be determined according to the capability update indication information. In this way, the terminal can report its changed transmission capability with the permission of the NR base station, without the need to update its own transmission capability information in a detachment or reattachment manner, thereby satisfying the terminal's individual needs for dynamically reporting changed transmission capability while not affecting the service performance and user experience of the terminal. Accordingly, the reliability in transmission capability update can be improved.

According to some embodiments, on the basis of the device shown in FIG. 15, the transmission capability of the terminal includes a transmission capability of the terminal on different channel combinations in different frequency band combinations.

According to some embodiments, the transmission capability of the terminal on different channel combinations in different frequency band combinations includes: a capability of the terminal which indicates whether the terminal supports single uplink transmission or dual uplink transmission on one channel combination in one frequency band combination.

Figure 19:
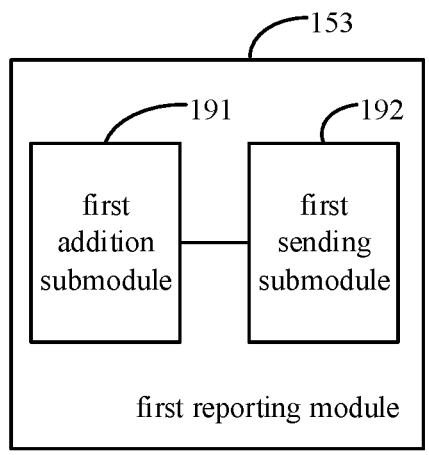
FIG. 19 is a block diagram of a transmission capability update device according to some embodiments.

According to some embodiments, on the basis of the device shown in FIG. 15, the first reporting module 153 may include a first addition submodule 191 and a first sending submodule 192 as shown in FIG. 19.

The first addition submodule 191 is configured to add the capability update report information to radio resource control (RRC) signaling.

The first sending submodule 192 is configured to send the RRC signaling to the NR base station, so that the NR base station obtains the changed transmission capability of the terminal from the RRC signaling.

As can be seen from the above embodiments, adding the capability update report information to the RRC signaling and sending the RRC signaling to the NR base station are beneficial for the NR base station to obtain the changed transmission capability of the terminal from the RRC signaling. This improves the reliability in transmission capability update.

Figure 20:
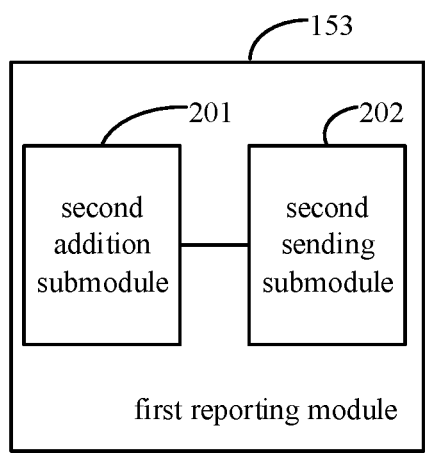
FIG. 20 is a block diagram of a transmission capability update device according to some embodiments.

According to some embodiments, on the basis of the device shown in FIG. 15, the first reporting module 153 includes a second addition submodule 201 and a second sending submodule 202 as shown in FIG. 20.

The second addition submodule 201 is configured to add the capability update report information to terminal assistance information signaling.

The second sending submodule 202 is configured to send the terminal assistance information signaling to the NR base station, so that the NR base station obtains the changed transmission capability of the terminal from the terminal assistance information signaling.

As can be seen from the foregoing embodiments, adding the capability update report information to the terminal assistance information signaling, and sending the terminal assistance information signaling to the NR base station are beneficial for the NR base station to obtain the changed transmission capability of the terminal from the terminal assistance information signaling, thereby enriching the transmission method of the capability update report information, and also improving the efficiency of transmission capability update.

Figure 21:
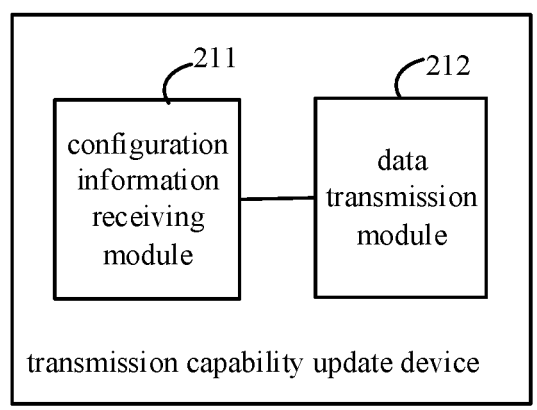
FIG. 21 is a block diagram of a transmission capability update device according to some embodiments.

According to some embodiments, on the basis of the device shown in FIG. 15, the device may further include a configuration information receiving module 211 and a data transmission module 212 as shown in FIG. 21.

The configuration information receiving module 211 is configured to receive transmission configuration information sent by the LTE base station. The transmission configuration information is information obtained after the LTE base station performs transmission configuration for the terminal according to the changed transmission capability of the terminal.

The data transmission module 212 is configured to perform data transmission according to the transmission configuration information.

As can be seen from the foregoing embodiments, transmission configuration information sent by an LTE base station is received, and the transmission configuration information is information obtained after the LTE base station performs transmission configuration for the terminal according to the changed transmission capability of the terminal.

Data transmission is performed according to the transmission configuration information. In this way, the terminal can perform data transmission according to the latest transmission configuration sent by the LTE base station, thereby improving the quality of data transmission and improving the utilization rate of transmission resources.

Figure 22:
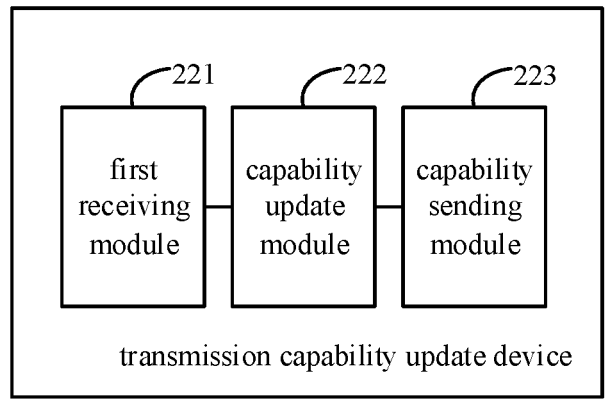
FIG. 22 is a block diagram of a transmission capability update device according to some embodiments.

FIG. 22 is a block diagram of a transmission capability update device according to some embodiments. The device may be applied in an NR base station, which is r a terminal and an LTE base station. The device is configured to perform the transmission capability update method as shown in FIG. 9. The transmission capability update device may include a first receiving module 221, a capability update module 222 and a capability sending module 223 as shown in FIG. 22.

The first receiving module 221 is configured to receive capability update report information sent by the terminal. The capability update report information includes a changed transmission capability of the terminal.

The capability update module 222 is configured to, when it is determined that a transmission capability of the terminal has changed according to the capability update report information, update locally stored information according to the changed transmission capability of the terminal.

The capability sending module 223 is configured to send the changed transmission capability of the terminal to the LTE base station, so that the LTE base station updates locally stored information according to the changed transmission capability of the terminal.

As can be seen from the foregoing embodiments, the NR base station can receive the capability update report information sent by the terminal. The capability update report information includes the changed transmission capability of the terminal. When it is determined that the transmission capability of the terminal has changed according to the capability update report information, locally stored information is updated according to the changed transmission capability of the terminal, and the changed transmission capability of the terminal is sent to the LTE base station, so that the LTE base station updates the locally stored information according to the changed transmission capability of the terminal. Accordingly, both the NR base station and LTE base stations can know the terminal's changed transmission capability, and update their respective information storage based on the terminal's changed transmission capability, without affecting service transmission of the terminal, thereby improving the efficiency of transmission capability update.

Figure 23:
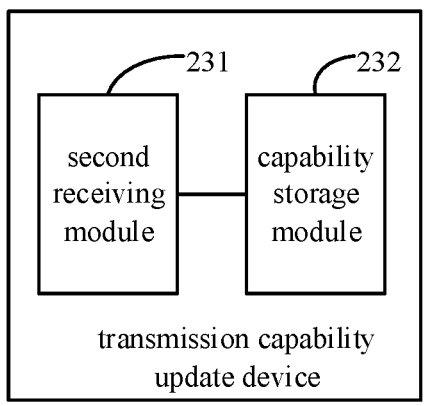
FIG. 23 is a block diagram of a transmission capability update device according to some embodiments.

According to some embodiments, on the basis of the device shown in FIG. 22, the device further includes a second receiving module 231 and a capability storage module 232 as shown in FIG. 23.

The second receiving module 231 is configured to receive initial capability report information sent by the terminal. The initial capability report information includes an initial transmission capability of the terminal.

The capability storage module 232 is configured to store the initial transmission capability of the terminal.

As can be seen from the foregoing embodiments, the initial capability report information sent by the terminal is received, and the initial capability report information includes the initial transmission capability of the terminal and stores the initial transmission capability of the terminal, and thus the practicability of transmission capability update is improved.

Figure 24:
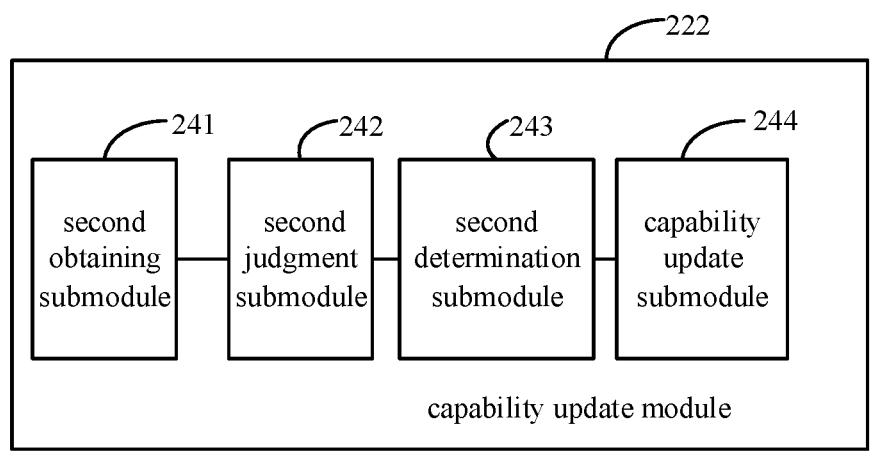
FIG. 24 is a block diagram of a transmission capability update device according to some embodiments.

According to some embodiments, on the basis of the device shown in FIG. 23, the capability update module 222 may include a second obtaining submodule 241, a second judgment submodule 242, a second determination submodule 243 and a capability update submodule 244 as shown in FIG. 24.

The second obtaining submodule 241 is configured to obtain the changed transmission capability of the terminal included in the capability update report information.

The second judgment submodule 242 is configured to determine whether the changed transmission capability of the terminal is different from the initial transmission capability of the terminal.

The second determination submodule 243 is configured to determine that the transmission capability of the terminal has changed if the second judgment submodule determines that changed transmission capability of the terminal is different from the initial transmission capability of the terminal.

The capability update submodule 244 is configured to update locally stored information according to the changed transmission capability of the terminal.

As can be seen from the foregoing embodiments, whether the transmission capability of the terminal has changed is determined by comparing the changed transmission capability of the terminal included in the capability update report information with the initial transmission capability of the terminal, and accordingly the accuracy of the transmission capability update is improved.

Figure 25:
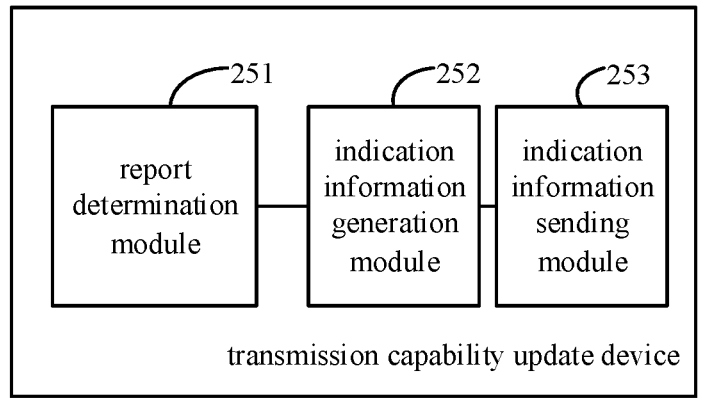
FIG. 25 is a block diagram of a transmission capability update device according to some embodiments.

According to some embodiments, on the basis of the device shown in FIG. 22 or 24, the device may further include a report determination module 251, an indication information generation module 252, and an indication information sending module 253 as shown in FIG. 25.

The report determination module 251 is configured to determine whether the terminal is allowed to report the changed transmission capability and obtain a determination result.

The indication information generation module 252 is configured to generate capability update indication information according to the determination result. The capability update indication information is used to indicate whether the terminal is allowed to report the changed transmission capability.

The indication information sending module 253 is configured to send the capability update indication information to the terminal, so that the terminal determines whether the NR base station allows the terminal to report the changed transmission capability according to the capability update indication information.

As can be seen from the foregoing embodiments, a determination result is obtained by determining whether the terminal is allowed to report the changed transmission capability, and the capability update indication information is generated according to the determination result. The capability update indication information is used to indicate whether the terminal is allowed to report the changed transmission capability. The capability update indication information is sent to the terminal, so that the terminal determines whether the NR base station allows the terminal to report the changed transmission capability based on the capability update indication information. In this way, the terminal can report its changed transmission capability under the permission of the base station, without the need to update its own transmission capability information in a detachment or reattachment manner, thereby meeting the individual needs of the terminal to dynamically report the changed transmission capability, without affecting the terminal's service performance and user experience, and improving reliability in transmission capability update.

Figure 26:
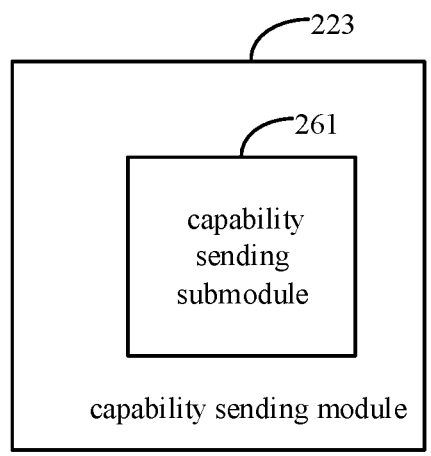
FIG. 26 is a block diagram of a transmission capability update device according to some embodiments.

According to some embodiments, on the basis of the device shown in FIG. 22, the capability sending module may include a capability sending submodule 261 as shown in FIG. 26.

The capability sending submodule 261 is configured to send the changed transmission capability of the terminal to the LTE base station through an X2 interface.

Figure 27:
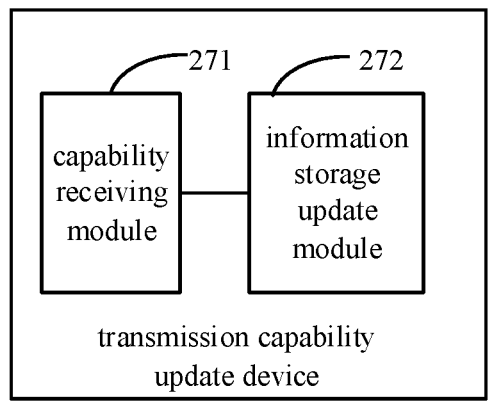
FIG. 27 is a block diagram of a transmission capability update device according to some embodiments.

FIG. 27 is a block diagram of a transmission capability update device according to some embodiments. The device is applied in an LTE base station, and the LTE base station is connected to a terminal and an NR base station. The device is configured to perform the transmission capability update method as shown in FIG. 13. the transmission capability update device may include a capability receiving module 271 and an information storage update module 272 as shown in FIG. 27.

The capability receiving module 271 is configured to receive a changed transmission capability of the terminal sent by the NR base station.

The information storage update module 272 is configured to update locally stored information according to the changed transmission capability of the terminal.

As can be seen from the foregoing embodiments, by receiving the changed transmission capability of the terminal sent by the NR base station, and updating the local information storage according to the changed transmission capability of the terminal, the efficiency in updating of the transmission capability is improved without affecting the service transmission of the terminal.

Figure 28:
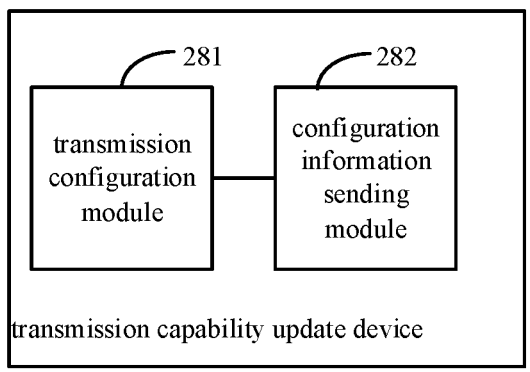
FIG. 28 is a block diagram of a transmission capability update device according to some embodiments.

According to some embodiments, on the basis of the device shown in FIG. 27, the device may further include a transmission configuration module 281 and a configuration information sending module 282 as shown in FIG. 28.

The transmission configuration module 281 is configured to perform transmission configuration for the terminal according to the changed transmission capability of the terminal to obtain transmission configuration information.

The configuration information sending module 282 is configured to send the transmission configuration information to the terminal, so that the terminal performs data transmission according to the transmission configuration information.

As can be seen from the foregoing embodiments, by performing transmission configuration for the terminal according to the changed transmission capability of the terminal, obtaining transmission configuration information, and transmitting the transmission configuration information to the terminal, the terminal can perform data transmission according to the latest transmission configuration sent by the LTE base station. This improves the quality of data transmission and also improves the utilization of transmission resources.

The device embodiments basically correspond to the method embodiments, details regarding the device embodiments can be found in the description regarding the method embodiments. The device embodiments described above are only schematic, in which the units described as separate components may or may not be physically separated, and the components shown as units may or may not be physical units, that is, they may be located in one place, or can be distributed across multiple network elements. Some or all of the modules can be selected according to actual needs to achieve the objectives of the technical solutions of the present disclosure. Those of ordinary skill in the art can understand and implement the technical solutions of the present disclosure without creative efforts.

Some embodiments of the present disclosure provide a non-transitory computer-readable storage medium having a computer program stored thereon, wherein the computer program is configured to implement the transmission capability update method according to any one of FIGS. 1 to 8.

Some embodiments of the present disclosure provide a non-transitory computer-readable storage medium having a computer program stored thereon, wherein the computer program is configured to implement the transmission capability update method according to any one of FIGS. 9 to 12.

Some embodiments of the present disclosure provide a non-transitory computer-readable storage medium having a computer program stored thereon, wherein the computer program is configured to implement the transmission capability update method according to any one of FIGS. 13 and 14.

Some embodiments of the present disclosure provide a transmission capability update device. The device is applied in a terminal and the terminal is connected to a long-term evolution (LTE) base station and a new radio (NR) base station. The device includes:

a processor; and memory for storing instructions executable by the processor;

the processor is configured to:

determine that a transmission capability of the terminal has changed;

generate capability update report information, wherein the capability update report information includes the changed transmission capability of the terminal; and send the capability update report information to the NR base station, so that the NR base station sends the changed transmission capability of the terminal to the LTE base station.

Figure 29:
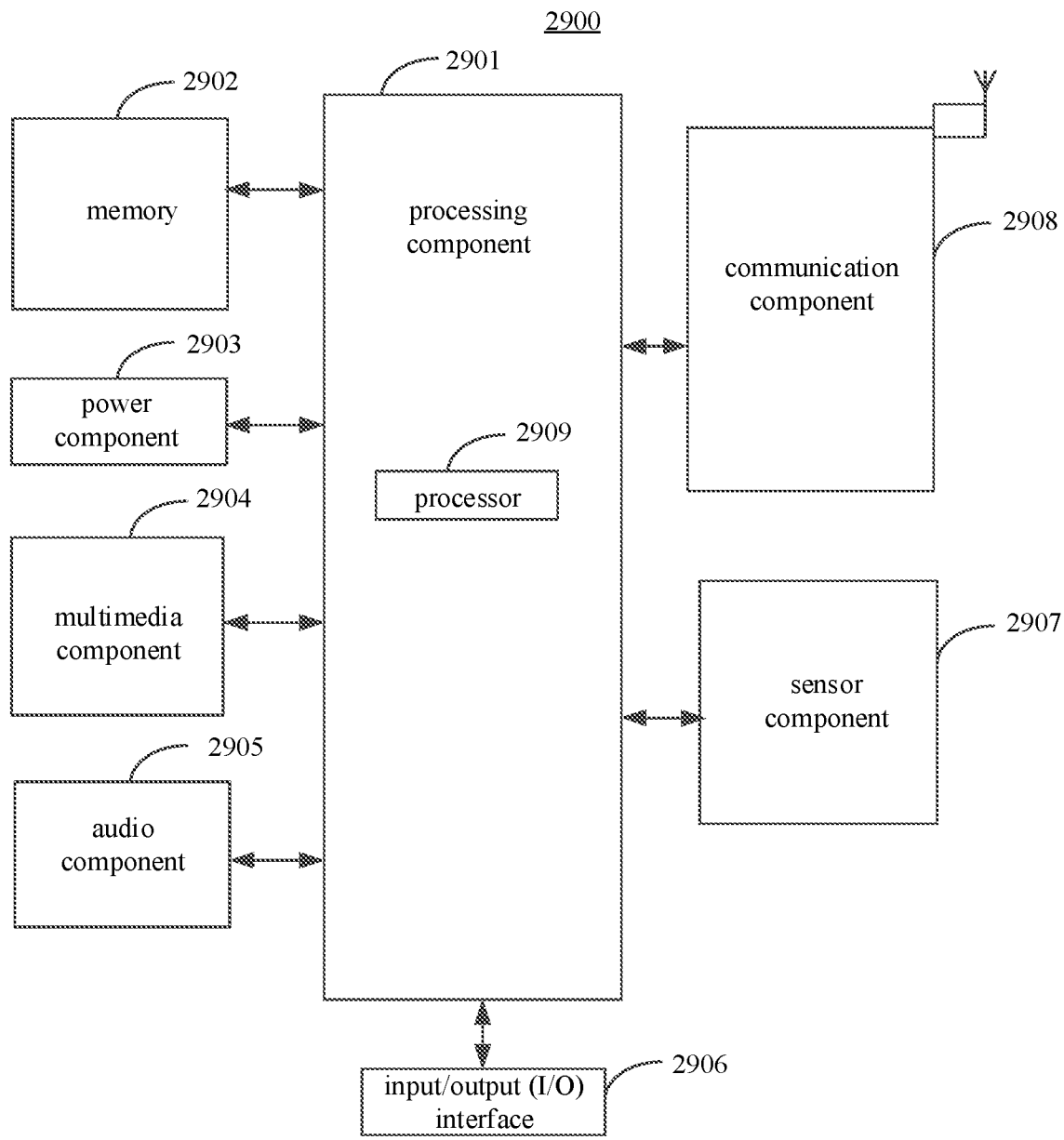
FIG. 29 is a block diagram of a transmission capability update device according to some embodiments.

FIG. 29 is a block diagram of transmission capability update device according to some embodiments. As shown in FIG. 29, the transmission capability update device 2900 may a computer, a mobile phone, a digital broadcast terminal, a messaging device, a gaming console, a tablet, a medical device, exercise equipment, a personal digital assistant, and the like.

Referring to FIG. 29, the device 2900 may include one or more of the following components: a processing component 2901, memory 2902, a power component 2903, a multimedia component 2904, an audio component 2905, an input/output (I/O) interface 2906, a sensor component 2907, and a communication component 2908.

The processing component 2901 typically controls overall operations of the device 2900, such as the operations associated with display, telephone calls, data communications, camera operations, and recording operations. The processing component 802 may include one or more processors 2909 to execute instructions to perform all or part of the steps in the above described methods. Moreover, the processing component 2901 may include one or more modules which facilitate the interaction between the processing component 2901 and other components. For instance, the processing component 2901 may include a multimedia module to facilitate the interaction between the multimedia component 2904 and the processing component 2901.

The memory 2902 is configured to store various types of data to support the operation of the device 2900. Examples of such data include instructions for any applications or methods operated on the device 2900, contact data, phonebook data, messages, pictures, video, etc. The memory 2902 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2903 provides power to various components of the device 2900. The power component 2900 may include a power management system, one or more power sources, and any other components associated with the generation, management, and distribution of power in the device 2900.

The multimedia component 2904 includes a screen providing an output interface between the device 2900 and the user. In some embodiments, the screen may include a liquid crystal display (LCD) and a touch panel (TP). In some embodiments, organic light-emitting diode (OLED) or other types of displays can be employed.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2904 includes a front camera and/or a rear camera. The front camera and the rear camera may receive an external multimedia datum while the device 2900 is in an operation mode, such as a photographing mode or a video mode. Each of the front camera and the rear camera may be a fixed optical lens system or have focus and optical zoom capability.

The audio component 2905 is configured to output and/or input audio signals. For example, the audio component 2905 includes a microphone ("MIC") configured to receive an external audio signal when the device 2900 is in an operation mode, such as a call mode, a recording mode, and a voice recognition mode. The received audio signal may be further stored in the memory 2902 or transmitted via the communication component 2908. In some embodiments, the audio component 2905 further includes a speaker to output audio signals.

The I/O interface 2906 provides an interface between the processing component 2901 and peripheral interface modules, such as a keyboard, a click wheel, buttons, and the like. The buttons may include, but are not limited to, a home button, a volume button, a starting button, and a locking button.

The sensor component 2907 includes one or more sensors to provide status assessments of various aspects of the device 2900. For instance, the sensor component 2907 may detect an open/closed status of the device 2900, relative positioning of components, e.g., the display and the keypad, of the device 2900, a change in position of the device 2900 or a component of the device 2900, a presence or absence of user contact with the device 2900, an orientation or an acceleration/deceleration of the device 2900, and a change in temperature of the device 2900. The sensor component 2907 may include a proximity sensor configured to detect the presence of nearby objects without any physical contact. The sensor component 2907 may also include a light sensor, such as a CMOS or CCD image sensor, for use in imaging applications. In some embodiments, the sensor component 2907 may also include an accelerometer sensor, a gyroscope sensor, a magnetic sensor, a pressure sensor, or a temperature sensor.

The communication component 2908 is configured to facilitate communication, wired or wirelessly, between the device 2900 and other devices. The device 2900 can access a wireless network based on a communication standard, such as WiFi, 2G, or 3G, or a combination thereof. In one exemplary embodiment, the communication component 2908 receives a broadcast signal or broadcast associated information from an external broadcast management system via a broadcast channel. In one exemplary embodiment, the communication component 2908 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 2900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as the memory 804 including instructions executable by the processor 2909 in the device 2900, for performing the above-described methods. For example, the non-transitory computer-readable storage medium may be a ROM, a RAM, a CD-ROM, a magnetic tape, a floppy disc, an optical data storage device, and the like.

When the instructions in the storage medium are executed by the processor, the device 2900 can implement the transmission capability update method according to any one of the above embodiments.

Some embodiments of the present disclosure provide a transmission capability update device, wherein the device is applied in a new radio (NR) base station which is connected to a terminal and a long-term evolution (LTE) base station, and the device includes:

a processor; and memory for storing instructions executable by the processor;

the processor is configured to:

receive capability update report information sent by the terminal, wherein the capability update report information includes a changed transmission capability of the terminal;

when it is determined that a transmission capability of the terminal has changed according to the capability update report information, update locally stored information according to the changed transmission capability of the terminal; and send the changed transmission capability of the terminal to the LTE base station, so that the LTE base station updates locally stored information according to the changed transmission capability of the terminal.

Figure 30:
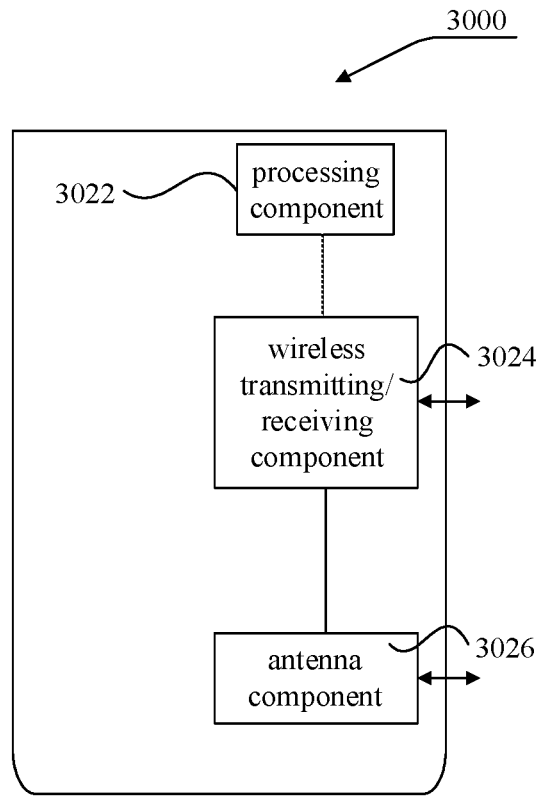
FIG. 30 is a block diagram of a transmission capability update device according to some embodiments.

FIG. 30 is block diagram of a transmission capability update device according to some embodiments. The device 3000 may be implemented as an NR base station. Referring to FIG. 30, the device 3000 includes a processing component 3022, a wireless transmitting/receiving component 3024, an antenna component 3026, and a signal processing portion unique to a wireless interface. The processing component 3022 may further include one or more processors.

One of the processors in the processing component 3022 may be configured to perform the transmission capability update method described in any one of the above embodiments.

Some embodiments of the present disclosure further provide a transmission capability update device. The device is applied in a long-term evolution (LTE) base station which is in communication with a terminal and a new radio (NR) base station. The device includes:

a processor; and memory for storing instructions executable by the processor;

the processor is configured to:

receive a changed transmission capability of the terminal sent by the NR base station; and update locally stored information according to the changed transmission capability of the terminal.

Figure 31:
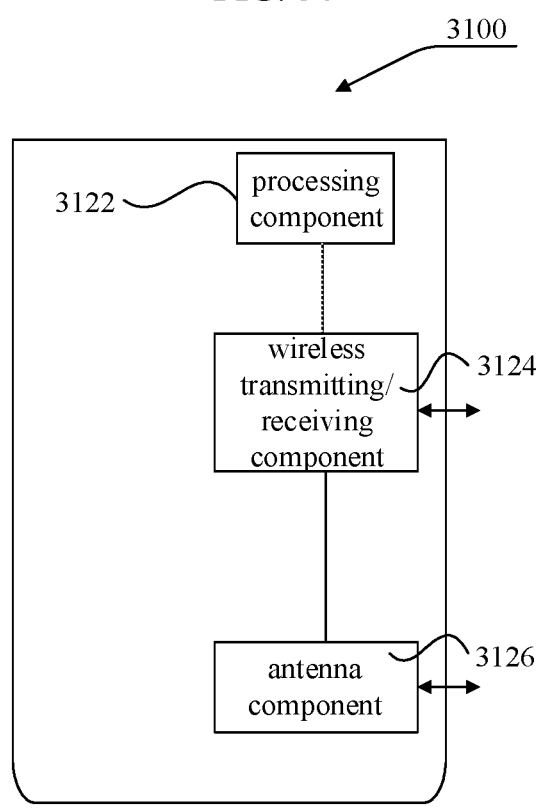
FIG. 31 is a block diagram of a transmission capability update device according to some embodiments.

FIG. 31 is a block diagram of a transmission capability update device according to some embodiments. The device 3100 may be implemented as an LTE base station. Referring to FIG. 31, the device 3100 includes a processing component 3122, a wireless transmitting/receiving component 3124, an antenna component 3126, and a signal processing portion unique to a wireless interface. The processing component 3122 may further include one or more processors.

One of the processors in the processing component 3122 may be configured to perform the transmission capability update methods according to any one of the above embodiments.

Various embodiments of the present disclosure can have one or more of the following advantages.

After determining that the transmission capability has changed, the terminal may actively generate capability update report information which includes the changed transmission capability of the terminal and send the capability update report information to the NR base station, so that the NR base station can send the changed transmission capability of the terminal to the LTE base station. Accordingly, both the NR base station and the LTE base station can learn the changed transmission capability of the terminal and update their respective information storage based on the changed transmission capability of the terminal without affecting service transmission of the terminal, thereby improving the efficiency of transmission capability update.

The NR base station in the present disclosure can receive the capability update report information sent by the terminal. The capability update report information includes the changed transmission capability of the terminal. When it is determined that the transmission capability of the terminal has changed according to the capability update report information, locally stored information is updated according to the changed transmission capability of the terminal, and the changed transmission capability of the terminal is sent to the LTE base station, so that the LTE base station updates the locally stored information according to the changed transmission capability of the terminal. Accordingly, both the NR base station and LTE base stations can know the terminal's changed transmission capability, and update their respective information storage based on the terminal's changed transmission capability, without affecting service transmission of the terminal, thereby improving the efficiency of transmission capability update.

The LTE base station in the present disclosure can receive the changed transmission capability of the terminal sent by the NR base station and update the locally stored information according to the changed transmission capability of the terminal, thereby improving the efficiency of transmission capability update without affecting service transmission of the terminal.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a standalone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A transmission capability update method, performed by a terminal in communication with a long-term evolution (LTE) base station and a new radio (NR) base station, the method comprising:
    sending initial capability report information to the LTE base station and the NR base station, wherein the initial capability report information comprises an initial transmission capability of the terminal;
    determining that a transmission capability of the terminal has changed;
    generating capability update report information indicating a changed transmission capability of the terminal; and
    sending the capability update report information to the NR base station, to facilitate the NR base station sending the changed transmission capability of the terminal to the LTE base station;
    wherein the transmission capability of the terminal comprises a capability of the terminal which indicates whether the terminal supports data transmission simultaneously on one frequency band combination without intermodulation interference.

2. The method according to claim 1, wherein the determining that a transmission capability of the terminal has changed comprises:
    obtaining the transmission capability of the terminal at a current time moment;
    determining whether the transmission capability of the terminal at the current time moment is different from the transmission capability of the terminal at a previous time moment; and
    upon determining that the transmission capability of the terminal at the current time is different from the transmission capability of the terminal at a previous time moment, determining that the transmission capability of the terminal has changed.

3. The method according to claim 1, further comprising:
    receiving capability update indication information sent by the NR base station, wherein the capability update indication information is used to indicate whether the terminal is allowed to report a changed transmission capability; and
    determining, according to the capability update indication information, whether the NR base station allows the terminal to report a changed transmission capability.

4. The method according to claim 1, wherein the sending the capability update report information to the NR base station comprises:
    adding the capability update report information to radio resource control (RRC) signaling; and
    sending the RRC signaling to the NR base station, so that the NR base station obtains the changed transmission capability of the terminal from the RRC signaling.

5. The method according to claim 1, wherein the sending the capability update report information to the NR base station comprises:
    adding the capability update report information to terminal assistance information signaling; and sending the terminal assistance information signaling to the NR base station, so that the NR base station obtains the changed transmission capability of the terminal from the terminal assistance information signaling.

6. The method according to claim 1, further comprising:
receiving transmission configuration information sent by the LTE base station, wherein the transmission configuration information is information obtained after the LTE base station performs transmission configuration for the terminal according to the changed transmission capability of the terminal; and
performing data transmission according to the transmission configuration information.

7. A transmission capability update method, performed by a new radio (NR) base station in communication with a terminal and a long-term evolution (LTE) base station, the method comprising:
receiving initial capability report information sent by the terminal, wherein the initial capability report information comprises an initial transmission capability of the terminal;
storing the initial transmission capability of the terminal;
receiving capability update report information sent by the terminal, wherein the capability update report information comprises a changed transmission capability of the terminal;
when it is determined that a transmission capability of the terminal has changed according to the capability update report information, updating locally stored information according to the changed transmission capability of the terminal; and
sending the changed transmission capability of the terminal to the LTE base station, so that the LTE base station updates locally stored information according to the changed transmission capability of the terminal;
wherein the transmission capability of the terminal comprises a capability of the terminal which indicates whether the terminal supports data transmission simultaneously on one frequency band combination without intermodulation interference.

8. The method according to claim 7, wherein the determining that a transmission capability of the terminal has changed according to the capability update report information comprises:
obtaining the changed transmission capability of the terminal comprised in the capability update report information;
determining whether the changed transmission capability of the terminal is different from the initial transmission capability of the terminal; and
if the changed transmission capability of the terminal is different from the initial transmission capability of the terminal, determining that the transmission capability of the terminal has changed.

9. The method according to claim 7, further comprising:
determining whether the terminal is allowed to report the changed transmission capability and obtaining a determination result;
generating capability update indication information according to the determination result, wherein the capability update indication information is used to indicate whether the terminal is allowed to report the changed transmission capability; and
sending the capability update indication information to the terminal, so that the terminal determines whether the NR base station allows the terminal to report the changed transmission capability according to the capability update indication information.

10. The method according to claim 7, wherein the sending the changed transmission capability of the terminal to the LTE base station comprises:
sending the changed transmission capability of the terminal to the LTE base station through an X2 interface.

11. A terminal in communication with a long-term evolution (LTE) base station and a new radio (NR) base station, the terminal comprising:
a processor;
memory storing instructions executable by the processor;
wherein the processor is configured to
send initial capability report information to the LTE base station and the NR base station, wherein the initial capability report information comprises an initial transmission capability of the terminal;
determine that a transmission capability of the terminal has changed;
generate capability update report information, wherein the capability update report information comprises the changed transmission capability of the terminal; and
send the capability update report information to the NR base station, so that the NR base station sends the changed transmission capability of the terminal to the LTE base station;
wherein the transmission capability of the terminal comprises a capability of the terminal which indicates whether the terminal supports data transmission simultaneously on one frequency band combination without intermodulation interference.

12. The terminal according to claim 11, wherein the processor is further configured to:
obtain the transmission capability of the terminal at a current time moment;
determine whether the transmission capability of the terminal at the current time moment is different from the transmission capability of the terminal at a previous time moment; and
determine that the transmission capability of the terminal has changed if it is determined that transmission capability of the terminal at the current time is different from the transmission capability of the terminal at a previous time moment.

13. The terminal according to claim 11, wherein the processor is further configured to:
receive capability update indication information sent by the NR base station, wherein the capability update indication information is used to indicate whether the terminal is allowed to report a changed transmission capability; and
determine, according to the capability update indication information, whether the NR base station allows the terminal to report a changed transmission capability.

* * * * *